(No Model.)
G. W. HARRINGTON.
LEAD LINED PIPE.
No. 474,322. Patented May 3, 1892.
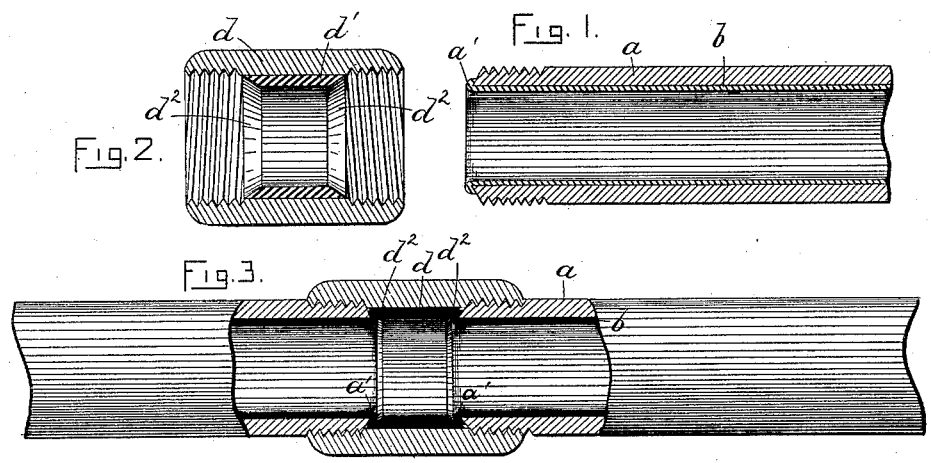
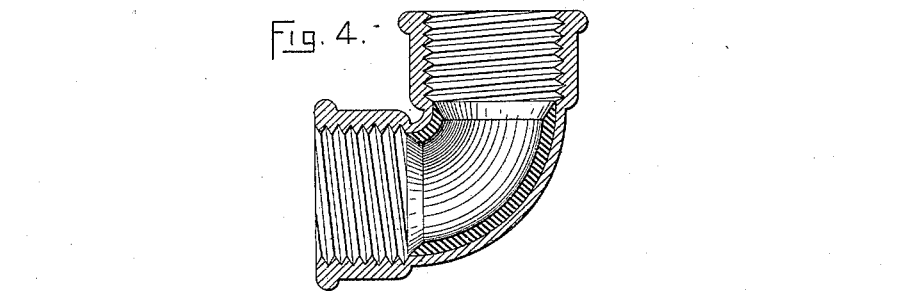
WITNESSES
Irving H. Fay.
H. A. Hall.
INVENTOR
G. W. Harrington
by Wright Brown Quimby
ATTYS

UNITED STATES PATENT OFFICE.

GEORGE W. HARRINGTON, OF WAKEFIELD, MASSACHUSETTS.

LEAD-LINED PIPE.

SPECIFICATION forming part of Letters Patent No. 474,322, dated May 3, 1892.

Application filed November 20, 1891. Serial No. 412,492. (No model.)

*To all whom it may concern:*

Be it known that I, GEORGE W. HARRINGTON, of Wakefield, in the county of Middlesex and State of Massachusetts, have invented certain new and useful Improvements in Lead-Lined Pipe, of which the following is a specification.

This invention relates to lead-lined pipe used particularly for service-pipes to connect water-mains with houses; and it has for its object to provide certain improvements in the formation of the ends of such pipes, whereby the lead lining may be caused to project to meet the lining of a coupling to which the pipe is screwed without being liable to injury by contact with the interior of the coupling when the pipe and coupling are being screwed together.

To this end the invention consists in the improvements which I will now proceed to describe and claim.

In the accompanying drawings, forming part of this specification, Figure 1 represents a longitudinal section of a lead-lined iron pipe provided with my improvement. Fig. 2 represents a longitudinal section of a coupling used to connect two lengths of said pipe. Fig. 3 represents a longitudinal section of a coupling and two lengths of pipe engaged therewith. Fig. 4 represents a sectional view of a coupling of elbow form.

The same letters of reference indicate the same parts in all the figures.

In the drawings, $a$ represents a wrought-iron pipe of the kind commonly used for service-pipes, and $b$ represents a lead lining in said pipe, said lining being composed of a tube of cold-pressed lead inserted in the pipe $a$ after it has been formed and expanded within the pipe, so that its outer surface is firmly pressed against the inner surface of the pipe. It is desirable to extend the lining outwardly upon the ends of the iron pipe, in order that the lead lining may project far enough to meet the lead lining in a coupling into which the iron pipe is screwed. Heretofore the lead lining has been extended beyond the ends of the iron pipe and turned outwardly to form a flat flange bearing upon and covering the end of the iron pipe and presenting a flat annular surface, the width of which is substantially the same as that of the combined thickness of the iron pipe and the lead lining. I have found that a flange thus formed is liable to be cracked or broken by the torsional strain exerted upon it by contact with the corresponding shoulder in the coupling into which the pipe is screwed, so that the continuity of the lining is broken and fissures are formed therein, which permit the access of water to the iron shell.

I obviate the objection above noted by forming the projecting portion of the lining into a narrow bead $a'$, which presents a convex surface to the corresponding shoulder in the coupling, and therefore has such a limited bearing upon the shoulder in the coupling that the torsional strain to which the projecting part of the lining is subjected during the operation of screwing the pipe into the coupling is not liable to crack or injure the lining in any way. The bead is considerably narrower than the thickness of the pipe, and owing to its convex surface in cross-section presents a limited bearing-surface to come in contact with the shoulder in the coupling that meets the projecting end of the lead lining.

The coupling $d$ has a lead lining $d'$, the ends of which are beveled to form seats or shoulders $d^2$ $d^2$, arranged to bear upon the beads $a'$ of the lengths of pipe screwed into the coupling. It will be seen that when the pipe is screwed into the coupling, as shown in Fig. 3, the beads $a'$ will bear upon the seats $d^2$ of the coupling lining, so that a practically continuous lead lining will be formed, extending through the lengths of pipe $a$ and through the couplings. Hence there will be no iron surfaces exposed to the water passing through the conduit composed of the lengths of pipe $a$ and couplings $d$.

The method of forming this bead forms the the subject-matter of another application filed by me February 19, 1892, Serial No. 422,083, and while I do not claim it herein, I illustrate and describe it to more clearly set forth the invention which I do claim in this case.

In Fig. 4 I show a coupling made of elbow form and provided with the lead lining $d'$, having beveled seats $d^2$ $d^2$ at its ends.

I use the term "convex" in describing the outer surface of the bead $a'$ to distinguish said surface from a flat surface; but the surface is not necessarily curved in cross-section, but may be V-shaped or of any form that will reduce its bearing on the corresponding shoulder in the coupling to the minimum.

I claim—

1. A lead-lined iron pipe having its end unflanged or of a diameter no greater than that of the body of the pipe and having a lead bead formed upon said end, said bead being integral with the lining and rounded or beveled outward to a point not exceeding the outer circle or edge of said end, for the purpose set forth.

2. A lead-lined iron pipe having lead beads of convex form in cross-section formed upon its ends, combined with a lead-lined coupling having seats on the ends of its lining, said seats being arranged to bear on the beads, as set forth.

In testimony whereof I have signed my name to this specification, in the presence of two subscribing witnesses, this 16th day of November, A. D. 1891.

GEORGE W. HARRINGTON.

Witnesses:
   C. F. BROWN,
   A. D. HARRISON.